United States Patent
Wang et al.

(10) Patent No.: US 10,592,311 B2
(45) Date of Patent: Mar. 17, 2020

(54) COMPUTING DEVICE RESOURCE MANAGEMENT

(71) Applicant: Microsoft Technology Licensing, LLC, Redmond, WA (US)

(72) Inventors: Bin Wang, Bellevue, WA (US); Dejun Zhang, Redmond, WA (US); Robert Yu Zhu, Bellevue, WA (US); Lei Zhang, Redmond, WA (US); Pengxiang Zhao, Bellevue, WA (US); Ying N. Chin, Bellevue, WA (US); Satyendra Bahadur, Yarrow Point, WA (US); Daryl A. Welsh, Bellevue, WA (US); Carlos Picoto, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 93 days.

(21) Appl. No.: 15/828,050

(22) Filed: Nov. 30, 2017

(65) Prior Publication Data

US 2019/0095251 A1 Mar. 28, 2019

Related U.S. Application Data

(60) Provisional application No. 62/564,888, filed on Sep. 28, 2017.

(51) Int. Cl.
*G06F 9/54* (2006.01)
*G06F 21/53* (2013.01)
(Continued)

(52) U.S. Cl.
CPC ............ *G06F 9/544* (2013.01); *G06F 9/4856* (2013.01); *G06F 9/5044* (2013.01);
(Continued)

(58) Field of Classification Search
CPC ........ G06F 9/544; G06F 9/546; G06F 9/5072; G06F 9/5044; G06F 9/4856; G06F 21/53;
(Continued)

(56) References Cited

U.S. PATENT DOCUMENTS

| | | | | |
|---|---|---|---|---|
| 7,680,957 B1* | 3/2010 | Ketterhagen | ............. | G06F 8/63 709/220 |
| 7,831,325 B1* | 11/2010 | Zhang | ................... | G06F 9/5044 700/108 |

(Continued)

OTHER PUBLICATIONS

Marcon, et al., "Workflow Specification and Scheduling with Security Constraints in Hybrid Clouds", In Proceedings of 2nd IEEE Latin American Conference on Cloud Computing and Communications, Dec. 9, 2013, pp. 29-34.

(Continued)

*Primary Examiner* — Francisco J Aponte
*Assistant Examiner* — Kevin X Lu
(74) *Attorney, Agent, or Firm* — Holzer Patel Drennan

(57) ABSTRACT

The disclosed technology adjusts hardware settings to map preferences consistently of a user experience across multiple hardware devices, despite there being different hardware capabilities and performance parameters among the different devices. A hardware settings translation engine receives a reference hardware setting of a reference computing device, a set of reference hardware performance parameter values, and a set of target hardware performance parameter values. The hardware settings translation engine then maps the set of target hardware performance parameter values to the set of reference hardware performance parameter values to yield a hardware adjustment map. The hardware settings translation engine determines the target hardware setting based on the reference hardware adjustment map and the reference hardware setting. The hardware settings transla- (Continued)

tion engine sets the target hardware to the target hardware setting.

20 Claims, 10 Drawing Sheets

(51) Int. Cl.
| | |
|---|---|
| *G06Q 10/10* | (2012.01) |
| *H04L 29/08* | (2006.01) |
| *H04W 8/22* | (2009.01) |
| *G06F 9/48* | (2006.01) |
| *G06F 9/50* | (2006.01) |
| *G06F 3/0482* | (2013.01) |
| *G06F 3/0481* | (2013.01) |

(52) U.S. Cl.
CPC ............ *G06F 9/5072* (2013.01); *G06F 9/546* (2013.01); *G06F 21/53* (2013.01); *G06Q 10/10* (2013.01); *H04L 67/148* (2013.01); *H04L 67/34* (2013.01); *H04W 8/22* (2013.01); *G06F 3/0482* (2013.01); *G06F 3/04812* (2013.01); *G06F 2221/033* (2013.01)

(58) Field of Classification Search
CPC ........... G06F 2221/033; G06F 3/04812; G06F 3/0482; G06F 9/5038; G06F 9/541; H04L 67/34; H04L 67/148; H04W 8/22; G06Q 10/10

See application file for complete search history.

(56) References Cited

U.S. PATENT DOCUMENTS

| | | | | |
|---|---|---|---|---|
| 8,175,863 | B1* | 5/2012 | Ostermeyer | G06F 17/5009 703/13 |
| 8,255,883 | B2 | 8/2012 | Sceppa et al. | |
| 8,346,974 | B2 | 1/2013 | Ruan et al. | |
| 9,110,674 | B1* | 8/2015 | Cui | G06F 9/38 |
| 9,652,420 | B2 | 5/2017 | Ruan et al. | |
| 9,773,471 | B2* | 9/2017 | Demos | G01J 3/02 |
| 2003/0177182 | A1 | 9/2003 | Clark et al. | |
| 2006/0090163 | A1* | 4/2006 | Karisson | G06F 11/3409 718/105 |
| 2007/0011334 | A1 | 1/2007 | Higgins et al. | |
| 2009/0125977 | A1 | 5/2009 | Chander et al. | |
| 2010/0064357 | A1 | 3/2010 | Baird et al. | |
| 2012/0011222 | A1 | 1/2012 | Yasukawa et al. | |
| 2012/0056911 | A1* | 3/2012 | Safaee-Rad | G09G 3/2003 345/690 |
| 2012/0182485 | A1* | 7/2012 | Sawada | H04N 9/3147 348/745 |
| 2013/0016681 | A1* | 1/2013 | Gholmieh | H04W 52/10 370/329 |
| 2013/0120589 | A1* | 5/2013 | Chang | H04N 9/69 348/189 |
| 2013/0339980 | A1 | 12/2013 | Meshar et al. | |
| 2015/0163266 | A1* | 6/2015 | Chatterjee | H04L 65/60 709/219 |
| 2017/0212794 | A1 | 7/2017 | Fadel et al. | |
| 2017/0270065 | A1 | 9/2017 | Ruan et al. | |
| 2017/0331904 | A1 | 11/2017 | Padhye et al. | |
| 2019/0095261 | A1 | 3/2019 | Wang et al. | |

OTHER PUBLICATIONS

"International Search Report and Written Opinion Issued in PCT Application No. PCT/US2018/039225", dated Sep. 6, 2018, 11 Pages.
"International Search Report and Written Opinion Issued in PCT Application No. PCT/US2018/039645", dated Sep. 19, 2018, 12 pages.
"IMFMetadata interface", Retreived From: <<http://msdn.microsoft.com/en-us/library/windows/desktop/ms696970(v=vs.85).aspx>>, Retreived on: Nov. 28, 2017, 4 Pages.
"IPropertyStore interface", Retreived From: <<http://msdn.microsoft.com/en-us/library/windows/desktop/bb761474(v=vs.85).aspx>>, Retrieved on: Nov. 28, 2017, 2 Pages.
"IStorageItemExtraProperties Interface", Retrieved From: <<http://msdn.microsoft.com/en-us/library/windowsphone/develop/windows.storage.fileproperties.istorageitemextraproperties.aspx>>, Retrieved on: Nov. 28, 2017, 2 Pages.
"Metadata", Retrieved From: <<https://developer.apple.com/library/mac/documentation/quicktime/qtff/Metadata/Metadata.html>>, Retrieved on: Nov. 28, 2017, 25 Pages.
"Mp4v2—iTunesMetadata.wiki", Retrieved From: <<http://code.google.com/p/mp4v2/wiki/iTunesMetadata>>, Retrieved Date: Nov. 28, 2017, 3 Pages.
"VideoProperties Class", Retrieved From: <<http://msdn.microsoft.com/en-us/library/windows/apps/br207811.aspx>>, Retrieved on: Nov. 28, 2017, 14 Pages.
"WM/MediaClassPrimaryID", Retrieved From: <<http://msdn.microsoft.com/en-us/library/windows/desktop/dd757959(v=vs.85).aspx>>, Retrieved on: Nov. 28, 2017, 2 Pages.
"WM/MediaClassSecondaryID", Retrieved From: <<http://msdn.microsoft.com/en-us/library/windows/desktop/dd757960(v=vs.85).aspx>>, Retrieved on: Nov. 28, 2017, 3 Pages.
"WM/MediaOriginalBroadcastDateTime", Retrieved From: <<http://msdn.microsoft.com/en-us/library/windows/desktop/dd757957(v=vs.85).aspx>>, Retrieved on: Nov. 28, 2017, 1 Page.
"MF_MT_Video_Rotation attribute", Retrieved From: <<http://msdn.microsoft.com/en-us/library/windows/desktop/hh162880(v=vs.85).aspx>>, Retrieved on: Nov. 28, 2017, 2 Pages.
"Metadata Properties for Media Files", Retrieved From: <<http://msdn.microsoft.com/en-us/library/windows/desktop/ff384862(v=vs.85).aspx>>, Retrieved on: Nov. 28, 2017, 12 Pages.
Hudek, Ted, "INF Models Section", Retrieved From: <<http://msdn.microsoft.com/en-us/library/windows/hardware/ff547456(v=vs.85).aspx>>, Apr. 20, 2017, 5 Pages.
Hudek, et al., "INF AddInterface Directive", Retrieved From: <<http://msdn.microsoft.com/en-us/library/windows/hardware/ff546310(v=vs.85).aspx>>, Apr. 20, 2017, 7 Pages.
Marshall, Don, "Multiple Audio Subdevices", Retrieved From: <<http://msdn.microsoft.com/en-us/library/windows/hardware/ff537578(v=vs.85).aspx>>, Apr. 20, 2017, 3 Pages.
"Non-Final Office Action Issued in U.S. Appl. No. 15/858,513", dated Jan. 10, 2019, 23 Pages.

\* cited by examiner

| Brightness Setting | 10% | 20% | 30% | 40% | 50% | 60% | 70% | 80% | 90% | 100% |
|---|---|---|---|---|---|---|---|---|---|---|
| Reference Device Output (lumens) | 250 | 275 | 300 | 325 | 350 | 375 | 400 | 425 | 450 | 475 |

702

| Brightness Setting | 10% | 20% | 30% | 40% | 50% | 60% | 70% | 80% | 90% | 100% |
|---|---|---|---|---|---|---|---|---|---|---|
| Target Device Output (lumens) | 275 | 300 | 325 | 350 | 375 | 400 | 425 | 450 | 475 | 500 |

704

| Device Output (lumens) | 250 | 275 | 300 | 325 | 350 | 375 | 400 | 425 | 450 | 475 | 500 |
|---|---|---|---|---|---|---|---|---|---|---|---|
| Reference Device Setting | 10% | 20% | 30% | 40% | 50% | 60% | 70% | 80% | 90% | 100% | 100% |
| Target Device Setting | 10% | 10% | 20% | 30% | 40% | 50% | 60% | 70% | 80% | 90% | 100% |

| Frequency(Hz) | 20 | 50 | 100 | 200 | 500 | 1000 | 2000 | 5000 | 10000 | 20000 |
|---|---|---|---|---|---|---|---|---|---|---|
| Reference Device Output (dB) | 54 | 56 | 59 | 60 | 60 | 60 | 60 | 60 | 55 | 50 |
| Output Device 1 Output (dB) | 50 | 52 | 55 | 60 | 60 | 60 | 60 | 60 | 55 | 50 |

| Frequency(Hz) | 20 | 50 | 100 | 200 | 500 | 1000 | 2000 | 5000 | 10000 | 20000 |
|---|---|---|---|---|---|---|---|---|---|---|
| Adjustment to Audio Device 1 | 4 | 4 | 4 | 0 | 0 | 0 | 0 | 0 | 0 | 0 |

| Frequency(Hz) | 20 | 50 | 100 | 200 | 500 | 1000 | 2000 | 5000 | 10000 | 20000 |
|---|---|---|---|---|---|---|---|---|---|---|
| Reference Device Output (dB) | 54 | 56 | 59 | 60 | 60 | 60 | 60 | 60 | 55 | 50 |
| Output Device 1 Output (dB) | 54 | 56 | 59 | 60 | 60 | 60 | 60 | 60 | 55 | 50 |

COMPUTING DEVICE RESOURCE MANAGEMENT

CROSS-REFERENCE TO RELATED APPLICATIONS

The present application claims benefit of priority to U.S. Provisional Patent Application No. 62/564,888, entitled "Vertical and Horizontal Solutions for Hardware/Software Resources Management" and filed on Sep. 28, 2017, which is specifically incorporated by reference herein for all that it discloses and teaches.

BACKGROUND

When switching among different computing devices, a user often adjusts hardware settings across the different devices, even when using the "same" mobile application on the "same" content on each device. Hardware inconsistencies between the devices can influence how the "same" application performs on each device. For example, a user watching a video using a phone-version of a player application on a smart phone may have to adjust the volume and screen brightness when the user wants to finish watching the same video on the tablet-version of the same player application on a tablet computer. These differences can negatively impact a user's experience with such devices, applications, and content.

SUMMARY

In at least one implementation, the disclosed technology adjusts target hardware settings of a target computing device relative to reference computing device set to a reference hardware setting. A hardware settings translation engine maps a set of target hardware performance parameter values to a set of reference hardware performance parameter values to create a hardware adjustment map, the hardware adjustment map defining a relationship between a reference hardware performance parameter value corresponding to a hardware setting of the reference computing device and a target hardware performance parameter value corresponding to a hardware setting of the target computing device. The hardware settings translation engine determines the target hardware setting corresponding to the reference hardware setting based on mapped hardware performance parameter values of the hardware adjustment map. The hardware settings translation engine adjusts the target computing device in accordance with the determined target hardware setting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 7 illustrates an example target hardware adjustment map created by mapping a set of reference hardware performance parameter values to a set of target hardware performance parameter values.

DETAILED DESCRIPTIONS

One or more implementations detailed herein provide a method and system for adjusting hardware settings based on user preferences to create a customized user experience. For example, a user may be streaming a video on a mobile phone. Before the video is finished, the user may decide to continue watching the video on a tablet computer. The user may manually adjust the hardware settings on the tablet computer in an effort to watch the video on the tablet computer with the same screen brightness, color saturation, and volume as the mobile phone. However, manually adjusting hardware settings can be time-consuming, and the user may not achieve the same results on the new device. The perceived differences in device performance (e.g., screen brightness, display contrast, volume) may have detrimental effects on the user's experience, especially if manual adjustment is difficult. For example, contrast ratio, color saturation, and color temperature all affect the user perception of a display but are not adjusted as easily or frequently as screen brightness. In addition, some hardware settings are not manually adjustable, although they may be adjustable by an operating system or utility software.

Various implementations described herein allow hardware devices to share data about hardware settings and performance parameters, allowing one device to translate hardware settings among different devices. Therefore, when the user switches between devices, manual adjustment of hardware settings is not necessary to achieve the user's preferred cross-device hardware settings or a consistent user experience across multiple devices.

Although this description tends to focus on providing a consistent user experience across multiple devices, some implementations may provide intentionally different user experiences among different devices. For example, a system or user may select a preference for a louder setting on a smart television than on a mobile phone outputting audio through headphones (e.g., potentially a hearing safety setting). As such, a mapping bias can be made set on an individual device basis or between different pairs of devices. Such a mapping bias can increase or decrease a target device performance (e.g., audio output) relative to a reference device performance (e.g., audio output through headphones is mapped to be relatively quieter than audio output through a smart television). Another example would be adjusting equalizer settings on different devices to provide a similar magnitude of audio output while adjusting different frequency band outputs to take advantage of a higher quality sound system or to accommodate a poorer quality sound system. Accordingly, while user experience consistency may be a goal in some implementations, other implementations may have other objectives, such as taking best advantage of target device capabilities or enhancing the performance of a less capable target device.

Figure 1:
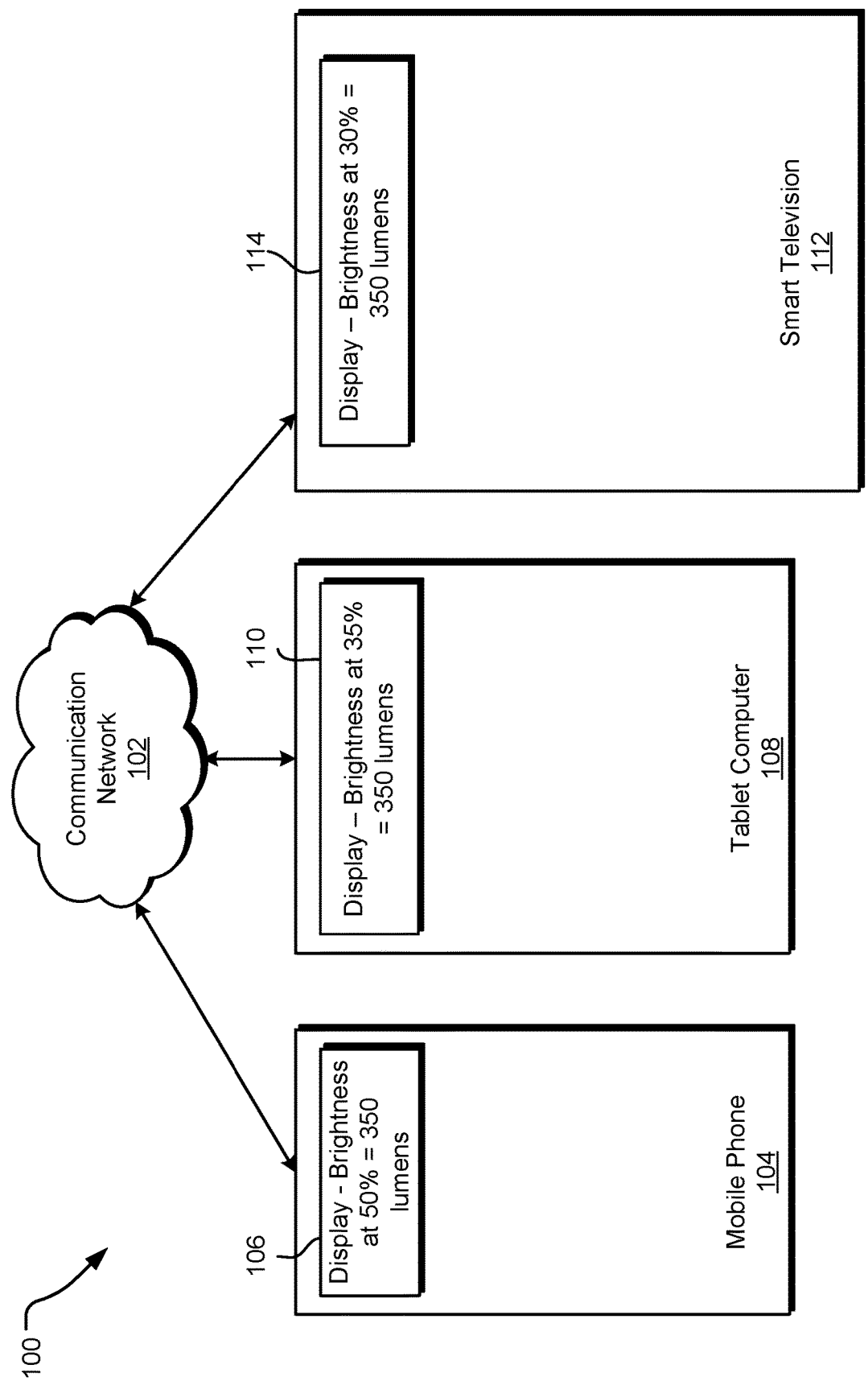
FIG. 1 illustrates an example environment for adjusting hardware settings to match user preferences across devices.

FIG. 1 illustrates an example environment 100 for adjusting hardware settings to match user preferences across devices. The example environment 100 includes a communication network 102, a mobile phone 104 with a display 106, a tablet computer 108 with a display 110, and a smart television 112 with a display 114. Because the display 106 of the mobile phone 104, the display 110 of the tablet computer 108, and the display 114 of the smart television 112 have different hardware characteristics (e.g., different components, different response curves, different performance capabilities), the same setting on all three displays may result in different levels of brightness across the three displays. For example, a setting of 50% brightness on the display 106 of the mobile phone 104 may emit 350 lumens of light, while a setting of 50% brightness on the display 110 of the tablet computer 108 may emit 400 lumens of light.

A user may notice the difference in display brightness between different devices and spend time adjusting hardware settings to attempt to get a correspondingly consistent output when switching between devices. In one implementation, a hardware settings translation engine enables a processor to accomplish such corresponding adjustments automatically. For example, when the mobile phone 104, the tablet computer 108, and the smart television 112 are all connected to the communication network 102, the display settings may be automatically adjusted when the user switches between devices. So, if, for example, the user sets the display 106 of mobile phone 104 to emit 350 lumens of light, that may correspond to a setting of 50% brightness on the mobile phone 104. When the user switches to the tablet computer 108, the hardware settings translation engine may adjust the settings for the display 110 of the tablet computer 108 so that it also emits 350 lumens of light, which may equate to a setting of 40% brightness on the tablet computer 108. When the user moves to the smart television 112, the hardware settings translation engine may adjust the settings for the display 114 of the smart television 112 so that it also emits 350 lumens of light, which may equate to a setting of 35% brightness on the smart television 112.

The hardware settings translation engine may adjust the settings for any piece of hardware using hardware performance parameters. A hardware performance parameter value is the output of a particular piece of hardware for a given hardware setting. The hardware settings translation engine uses sets of hardware performance parameter values for both a piece of reference hardware and a piece of target hardware to translate between the hardware settings of a reference device and the hardware settings of a target device. By mapping a set of target hardware performance parameter values to a set of reference hardware performance parameter values, the hardware settings translation engine develops a map for how the hardware settings should be adjusted across devices to obtain the desired hardware output. The mapping process is discussed in more detail with reference to FIG. 7.

While the system is shown in FIG. 1 with reference to display brightness settings, the system may be used to automatically control other hardware settings. For example, audio volume, touch screen sensitivity, display color saturation, microphone sensitivity, and any other hardware setting may be configured using a hardware settings translation engine. Further, the hardware settings translation engine can be used to take into account other factors when determining hardware settings, such as ambient light, ambient sound, geographic location, and time of day. Additionally, the hardware settings translation engine can be used to adjust hardware settings on any hardware device communicatively connected to a communication network, including, without limitation, personal computers, tablet computers, mobile phones, smart televisions, wireless headsets, wireless speakers, etc.

Figure 2:
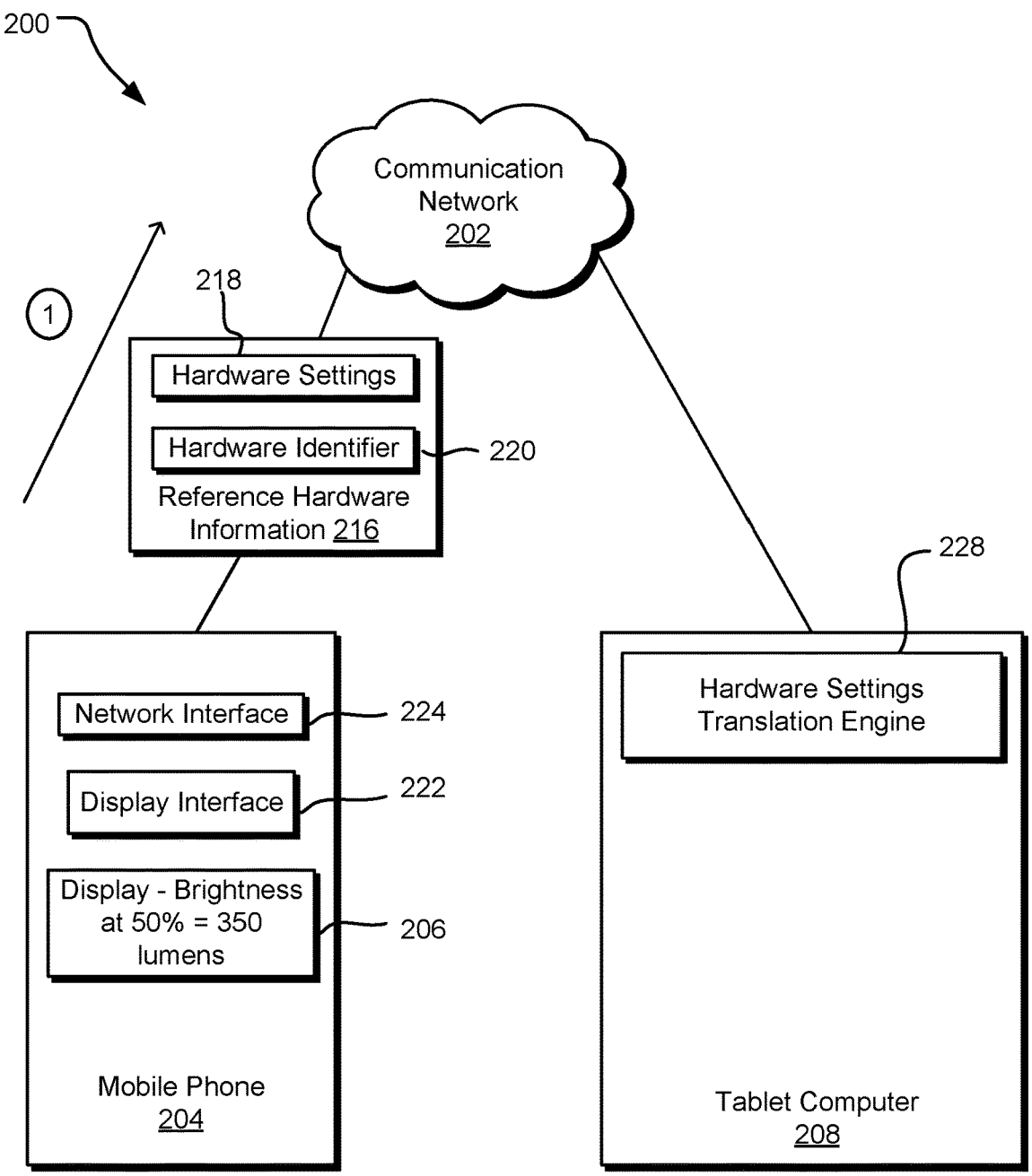
FIG. 2 illustrates an example environment for communicating reference hardware information, including hardware settings of a reference computing device and a hardware identifier, from a mobile phone to a communication network.

FIG. 2 illustrates an example environment 200 for communicating reference hardware information 216, including hardware settings 218 of a reference computing device and a hardware identifier 220, from a mobile phone 204 to a communication network 202. The reference hardware information 216 of the mobile phone 204 allows a hardware settings translation engine on another device, such as a hardware settings translation engine 228 on a tablet computer 208 in this implementation, to obtain information about the hardware performance of the mobile phone 204 and previous settings on the mobile phone 204.

The hardware settings translation engine 228 uses the reference hardware information to determine appropriate hardware settings for a target device. In this implementation, the mobile phone 204 is the reference device and the tablet computer 208 is the target device. The reference device may be any device that a user has adjusted to the user's desired hardware settings. The goal is then for the hardware settings translation engine 228 to determine proper hardware settings for the target device based on the settings of the reference device. Though in this implementation the goal is to equalize screen brightness across the mobile phone 204 and the tablet computer 208, in other implementations the goal may be to optimize output based on device performance or to determine hardware settings based on both the settings of the reference device and on the environment of both the reference device and the target device.

To equalize hardware outputs between the mobile phone 204 and the tablet computer 208, the mobile phone 204 communicates the reference hardware information 216 to the communication network 202. A display interface 222 receives the hardware settings 218 from a display 206 of the mobile phone 204. Here, the display interface 222 would receive hardware settings 218 from the display 206 of the mobile phone 204 indicating that the display 206 of the mobile phone 204 is set at 50% of its highest brightness output. The display interface 222 then sends the hardware settings 218 to a network interface 224 of the mobile phone 204.

The network interface 224 of the mobile phone 204 also receives the hardware identifier 220 from the memory of the mobile phone 204. The hardware identifier may be any identifier that allows another device to identify the reference device. For example, the hardware identifier may be a globally unique identifier (GUID) or any other unique identifier to identify a particular type or version of a hardware component. The network interface 224 of the mobile phone 204 then communicates the reference hardware information 216, including the hardware settings 218 of the reference computing device and the hardware identifier 220 to the communication network 202. In some implementations, the network interface 224 of the mobile phone 204 may communicate additional information to the communication network 202 as part of the reference hardware information 216. For example, the network interface 224 of the mobile phone 204 may communicate sensor data, location data, time data, content data, or user history to the communication network 202 as part of the reference hardware information 216.

Figure 3:
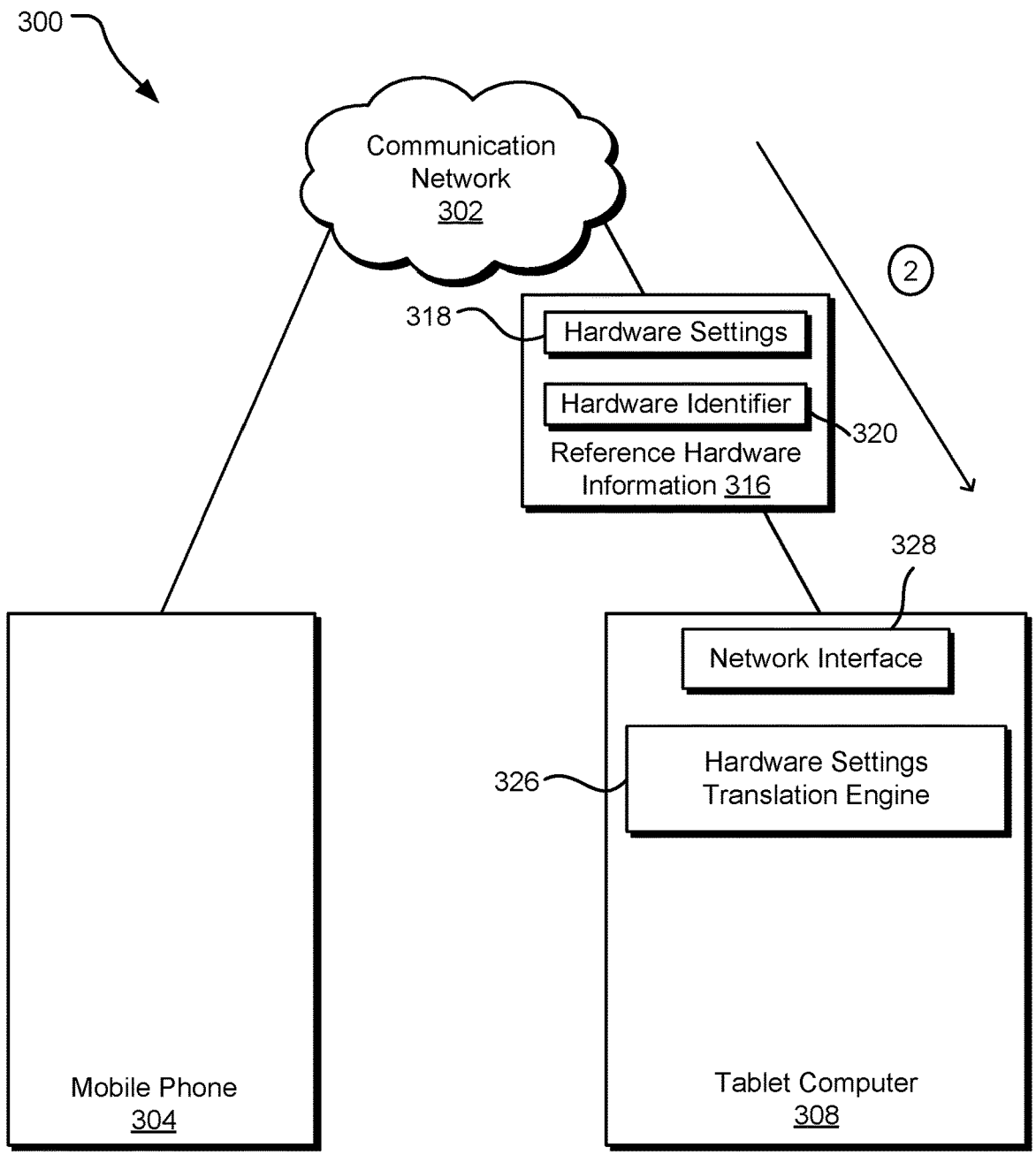
FIG. 3 illustrates an example environment for communicating reference hardware information, including hardware settings for a reference computing device and a hardware identifier, from a communication network to a target device.

FIG. 3 illustrates an example environment 300 for communicating reference hardware information 316, including hardware settings 318 for a reference computing device and a hardware identifier 320, from a communication network 302 to a target device. A hardware settings translation engine 328 of the target device (here, a tablet computer 308) uses the hardware settings 318 for the reference computing device and the hardware identifier 320 to determine hardware settings for the tablet computer 308. In this implementation, the hardware settings translation engine 328 of the tablet computer 308 uses the hardware settings 318 of the reference device and the hardware identifier 320 to set the display of the tablet computer 308 to output the same brightness as the display of the mobile phone 304.

A network interface 326 of the tablet computer 308 receives the reference hardware information 316, including the hardware settings 318 of the reference device and the hardware identifier 320 from the communication network 302. The reference hardware information 316 passed to the communication network 302 by the mobile phone 304 is further passed to the network interface 326 of the tablet computer 308 when a user switches between the mobile phone 304 and the tablet computer 308 and both devices are connected to the communication network 302. After receiving the reference hardware information 316 from the communication network 302, the network interface 326 of the tablet computer 308 passes the reference hardware information 316 on to the hardware settings translation engine 328. In some implementations, the reference hardware information 316 may include additional data, such as a reference hardware performance parameter values, reference hardware sensor data, or other data about the reference hardware.

Figure 4:
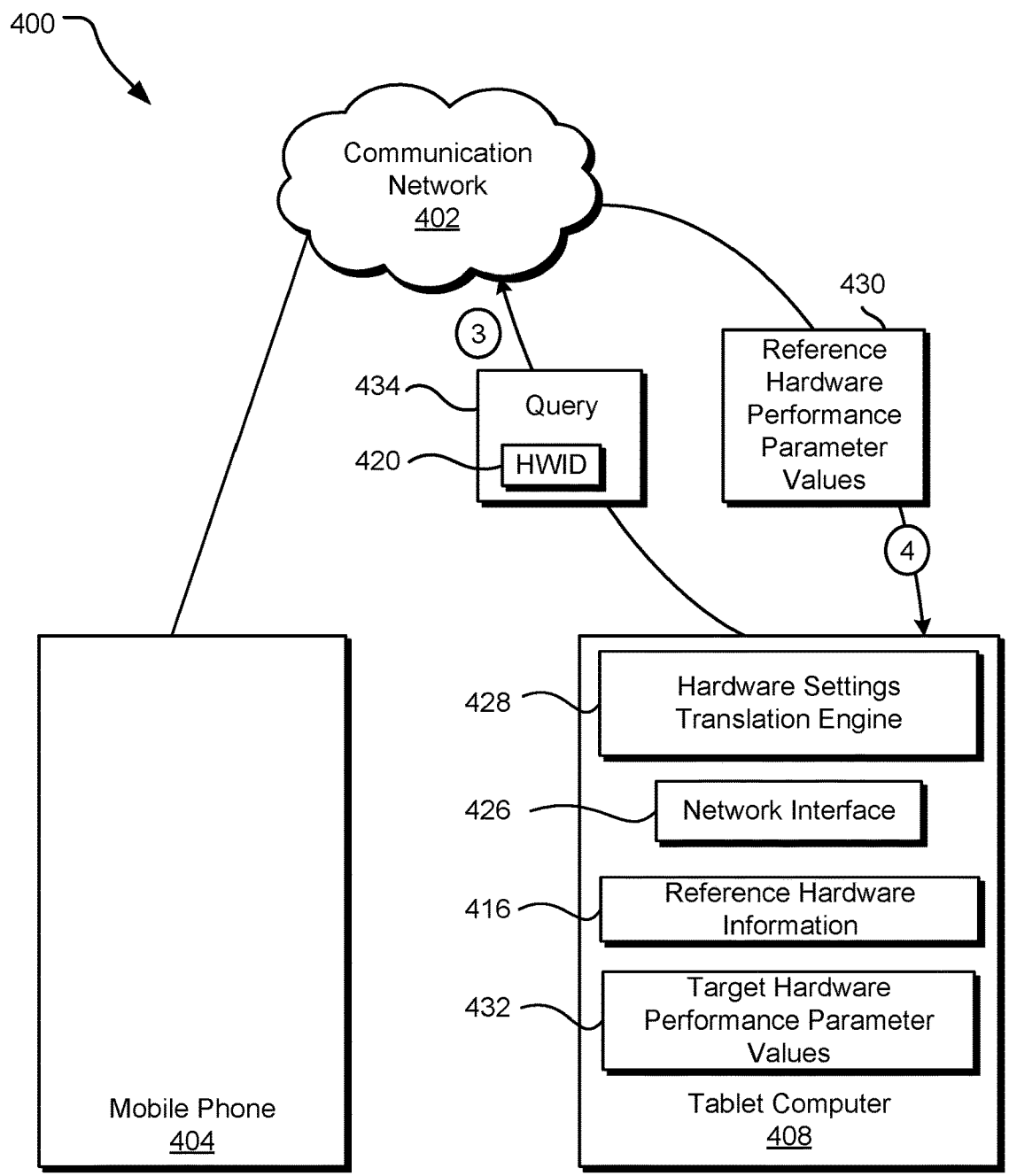
FIG. 4 illustrates an example environment for requesting a set of reference hardware performance parameter values from a communication network and receiving the set of reference hardware performance parameter values from the communication network.

FIG. 4 illustrates an example environment 400 for requesting a set of reference hardware performance parameter values 430 from a communication network 402 and receiving the set of reference hardware performance parameter values 430 from the communication network 402. After receiving reference hardware information 416 corresponding to a mobile phone 404, a hardware settings translation engine 428 translates hardware settings of a reference computing device to hardware settings of a target computing device. To make that translation possible, the hardware settings translation engine 428 uses information about the performance of hardware in the reference computing device and the target computing device. The information about the performance of the reference computing device is the set of reference hardware performance parameter values. The information about the performance of the target computing device is the set of target hardware performance parameter values.

The set of reference hardware performance parameter values 430 and the set of target hardware performance parameter values 432 indicate the hardware output for a hardware device set to a certain hardware setting. For example, in one implementation, the set of reference hardware performance parameter values 430 may be expressed as a table or graph showing the brightness output of the display of the mobile phone in lumens for each possible brightness setting on the mobile phone 404 as a percentage of the highest possible brightness setting. Similarly, the set of target hardware performance parameter values 432 may be expressed as a table or graph showing the brightness output of the display of the tablet computer in lumens for each possible brightness setting on the tablet computer 408 as a percentage of the highest possible brightness setting.

In this implementation, the hardware settings translation engine 428 receives the set of reference hardware performance parameter values 430 from the communication network 402, via a network interface 426 of the tablet computer 408. The hardware settings translation engine 428 queries the network interface 426 of the tablet computer 408 by sending a query 434 for the set of reference hardware performance parameter values 430 including a reference hardware identifier 420. The network interface 426 of the tablet computer 408 then passes along the query to the communication network 402. The communication network 402 then returns the set of reference hardware performance parameter values 430 to the tablet computer network interface 426. Finally, the tablet computer network interface 426 returns the set of reference hardware performance parameter values 430 to the hardware settings translation engine 428.

The hardware settings translation engine 428 also receives the set of target hardware performance parameter values 432. In this implementation, the tablet computer 408 stores the set of target hardware performance parameter values 432 in a location in memory of the tablet computer 408. After querying the tablet computer network interface 426, the hardware settings translation engine 428 retrieves the set of target hardware performance parameter values 432 from the memory of the tablet computer 408.

In other implementations, the hardware settings translation engine 428 may receive both the set of reference hardware performance parameter values 430 and the set of target hardware performance parameter values 432 from the communication network 402. In yet another implementation, the set of reference hardware performance parameter values 430 and the set of target hardware performance parameter values 432 are both stored in the memory of the target computing device. Alternatively, the hardware settings translation engine 428 may receive the set of reference hardware performance parameter values 430 as part of the reference hardware information sent from the reference computing device to the communication network 402.

The set of reference hardware performance parameter values 430 and the set of target hardware performance parameter values 432 may include different data depending on what hardware output is being set on a target device. For example, when the hardware settings translation engine 428 is translating volume settings between the reference computing device and the target computing device, the set of reference hardware performance parameter values 430 may be expressed as a chart or table including the volume output in decibels for different volume settings on the reference computing device as a percentage of the highest volume setting on the reference computing device. Similarly, the set of target hardware performance parameter values 432 may be expressed as a chart or table including the volume output in decibels for different volume settings on the target computing device as a percentage of the highest volume setting on the target computing device. The set of reference hardware performance parameter values 430 and the set of target hardware performance parameter values 432 may also be, without limitation, frequency response data, color saturation data, touch screen sensitivity data, or contrast ratio data.

Further, the set of reference hardware performance parameter values 430 and the set of target hardware performance parameter values 432 may be a response definition of hardware. For example, the response definition may be the frequency response of audio output hardware for a variety of frequency inputs. The set of reference hardware performance parameter values 430 and the set of target hardware performance parameter values 432 may be created from manufacturer data or may be constructed over time from collected data about the device's performance over time.

Figure 5:
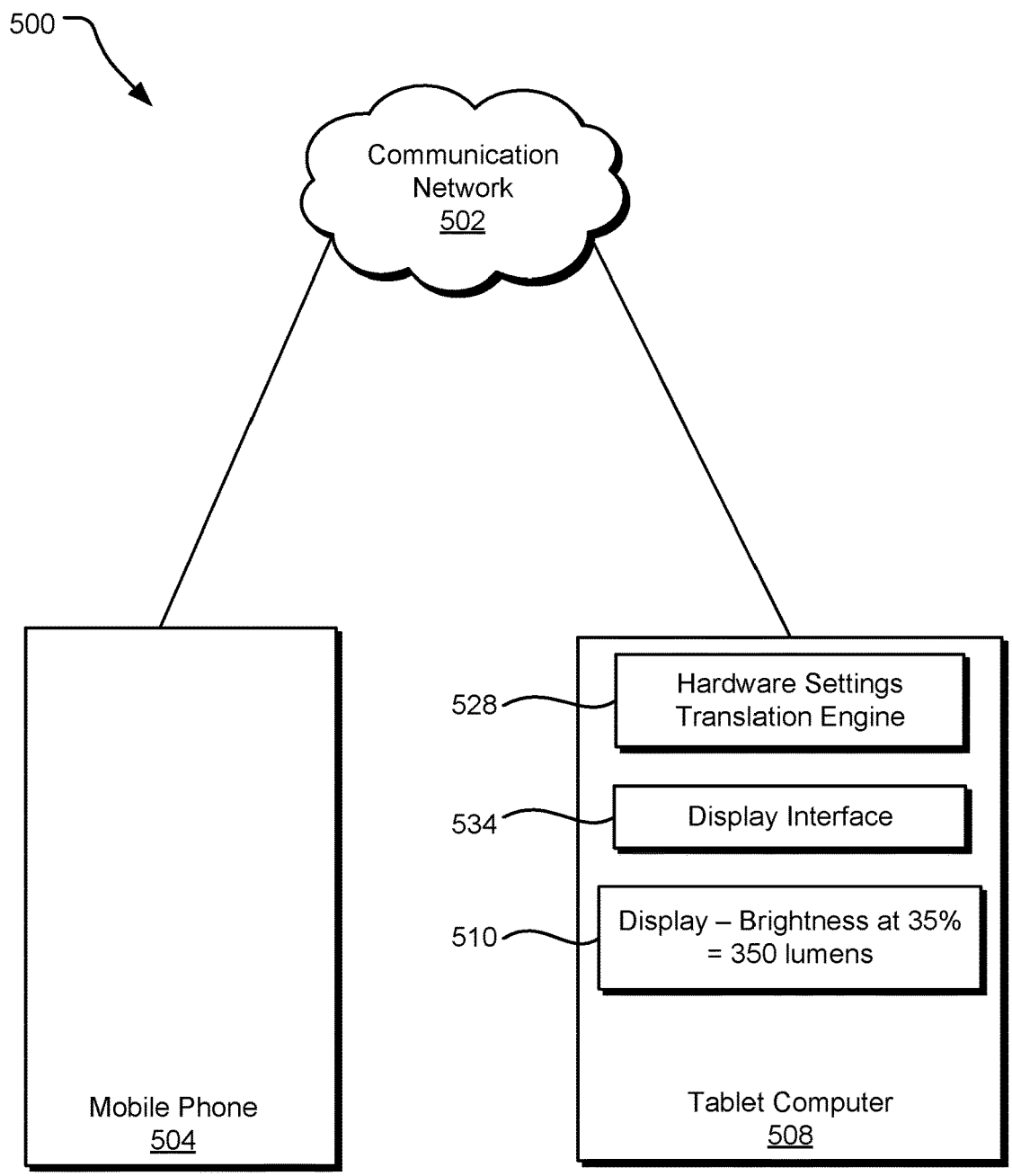
FIG. 5 illustrates an example environment for setting hardware on a target computing device connected to a communication network to a calculated target hardware setting.

FIG. 5 illustrates an example environment 500 for setting hardware on a target computing device connected to a communication network 502 to a calculated target hardware setting. In this implementation, after receiving a set of reference hardware performance parameter values corresponding to a mobile phone 504 and a set of target hardware performance parameter values corresponding to a tablet computer 508, a hardware settings translation engine 528 determines a brightness setting for a display 510 of the tablet computer 508. The brightness setting for the display 510 of the tablet computer 508 is determined by mapping the set of reference hardware performance parameter values corresponding to the mobile phone 504 to the set of target hardware performance parameter values corresponding to the tablet computer 508 to create a hardware adjustment map. The hardware adjustment map enables translation between the hardware settings of the reference device and the hardware settings of the target device. The mapping process is discussed in more detail with reference to FIG. 7.

The hardware settings translation engine 528 then passes the determined brightness setting to a display interface 534 of the tablet computer 508. Finally, the display interface 534 of the tablet computer 508 adjusts the display 510 of the tablet computer 508 to the determined setting. In this implementation, once the adjustment is completed, the display 510 of the tablet computer 508 emits 350 lumens, which is the same brightness that was output by the display of the mobile phone 504.

In some implementations, the hardware adjustment map may also be based on other data. For example, the hardware settings translation engine 528 may receive and take into account sensor data from both the mobile phone 504 and the tablet computer 508. In one implementation, the hardware settings translation engine 528 receives ambient light data from the mobile phone 504 and the tablet computer 508. The hardware settings translation engine uses the ambient light data to adjust the target hardware setting so that the display 510 of the tablet computer 508 is the same perceived brightness as the display of the mobile phone 504, taking into account the ambient light surrounding both the mobile phone 504 and the tablet computer 508.

Figure 6:
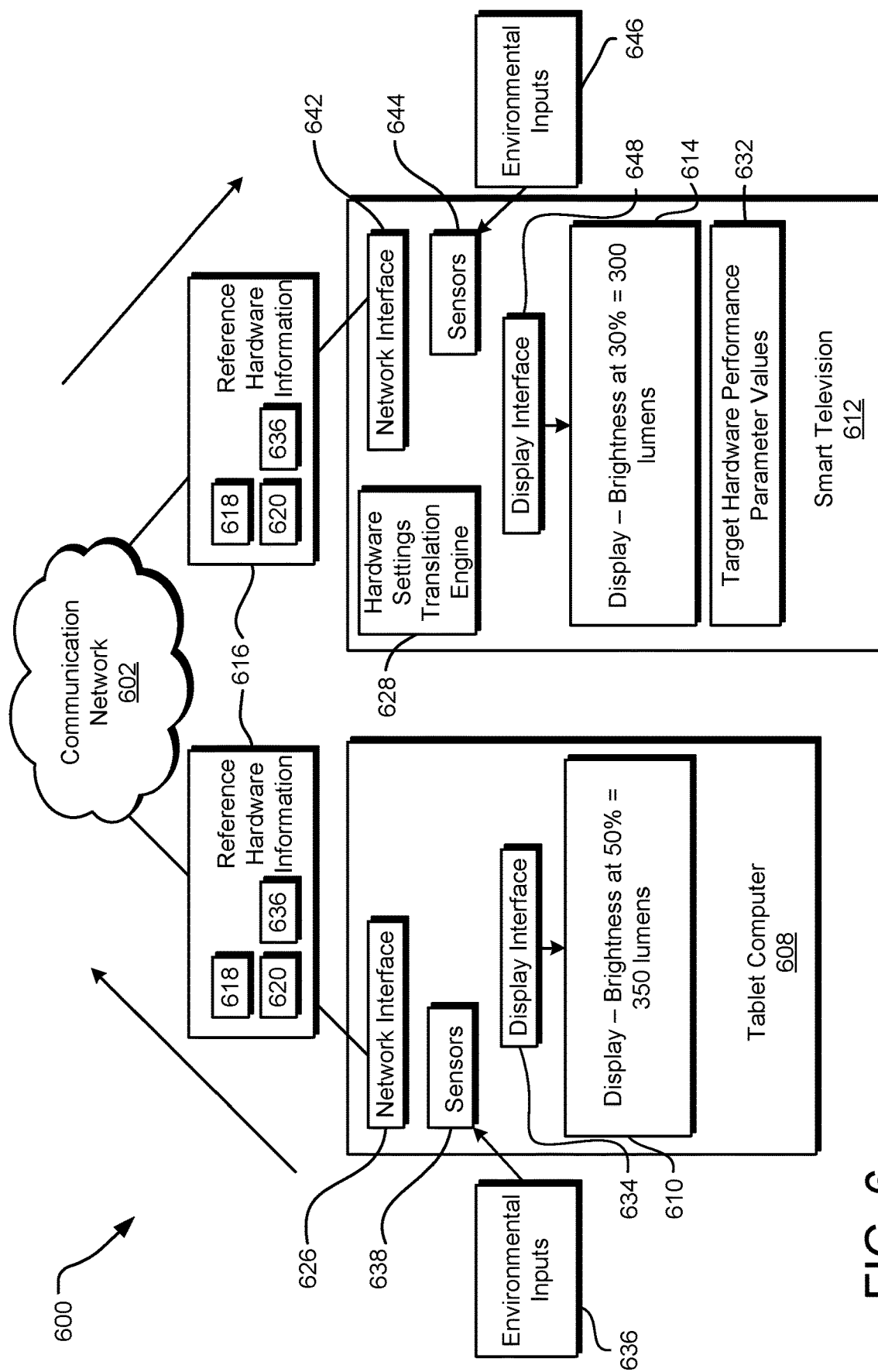
FIG. 6 illustrates an example environment for adjusting hardware settings to match user preferences across devices, taking into account environmental inputs to each device.

FIG. 6 illustrates an example environment 600 for adjusting hardware settings to match user preferences across devices, taking into account environmental inputs to each device. Different hardware settings may be advantageous in different environments. For example, in a darkened room, a display does not need to be as bright as a display in a bright room. In that situation, a hardware settings translation engine may receive ambient light data in addition to reference hardware information to ensure that the brightness settings are appropriate for the amount of ambient light around the display.

In this implementation, a tablet computer 608 receives reference environmental input 636 in the form of ambient light data through sensors 638 in the tablet computer 608. The reference environmental input 636 is then passed to a network interface 626. The tablet computer display interface 634 receives a reference hardware setting 618 from the display 610 of the tablet computer 608 and sends the reference hardware setting 618 to the network interface 626. The network interface 626 also receives a reference hardware identifier 620 from memory of the tablet computer 608. The network interface 626 of the tablet computer 608 then passes reference hardware information 616 including the reference environmental input 636, the reference hardware setting 618, and the reference hardware identifier 620 to a communication network 602.

After the tablet computer 608 passes the reference hardware information 616 to the communication network 602, a smart television 612 receives the reference hardware information 616 in order to determine settings for the display 614 of the smart television 612. A network interface 642 of the smart television 612 receives the reference hardware information 616 from the communication network 602 and passes the reference hardware information 616 to a hardware settings translation engine 628. At the same time, smart television sensors 644 target environmental input 646 in the form of ambient light data and pass the target environmental input 646 to the hardware settings translation engine 628. The hardware settings translation engine 628 then queries the communication network 602 to receive a set of reference hardware performance parameter values from the communication network 602. The hardware settings translation engine 628 also receives a set of target hardware performance parameter values 632 from the memory of the smart television 612.

Using the set of reference hardware performance parameter values, the set of target hardware performance parameter values 632, the reference environmental input 636, and the target environmental input 646, the hardware settings translation engine 628 determines appropriate brightness settings for a display 614 of the smart television 612. The hardware settings translation engine 628 then passes the brightness setting to a display interface 648 of the smart television 612. The display interface 648 of the smart television smart television 612 then sets the display 614 of the smart television 612 to the determined brightness setting.

In other implementations, the reference environmental input 636 and the target environmental input 646 may be any other data about the environment of the tablet computer 608 and the smart television 612. For example, the reference environmental input 636 and the target environmental input 646 could be, without limitation, ambient noise, what type of audio devices are connected to the devices, the geographic location of the devices, and acceleration.

FIG. 7 illustrates an example target hardware adjustment map 706 created by mapping a set of reference hardware performance parameter values 702 to a set of target hardware performance parameter values 704. In this implementation, the set of target hardware performance parameter values 704 are mapped to the set of reference hardware performance parameter values 702 to create the target hardware adjustment map 706. The set of target hardware performance parameter values 704 are the screen brightness output of a display of a target computing device at a variety of hardware settings. Likewise, the set of reference hardware performance parameter values 702 are the screen brightness output of a display of a reference computing device at a variety of hardware settings. The settings are expressed as percentages of a maximum setting on each device. The target hardware adjustment map 706 shows the hardware settings for both the reference device and the target device needed to achieve a certain hardware performance parameter, which is expressed here as screen brightness output. Here, the target hardware adjustment map 706 shows a direct translation between the reference hardware settings and the target hardware settings for each hardware performance parameter value.

A hardware settings translation engine can then use the target hardware adjustment map 706 to translate settings from the reference computing device to the target computing device. For example, if the reference computing device is set at a brightness setting of 50%, the target hardware adjustment map 706 shows that the target device should be set to a brightness setting of 40% to achieve the same hardware performance parameter value of 350 lumens. Here, that means that when the brightness setting of the target computing device is 40%, the target computing device will also output 350 lumens.

While the set of reference hardware performance parameter values 702, the set of target hardware performance parameter values 704, and the target hardware adjustment map 706 are each expressed as tables, other formats are possible. For example, the set of reference hardware performance parameter values 702 and the set of target hardware performance parameter values 704 may be related to hardware settings of the reference device and hardware settings of the target device, respectively, through graphs or other visual expressions. Further, and the target hardware adjustment map 706 may be, for example, a graph instead of a table of data. Further, the set of reference hardware performance parameter values 702 and the set of target hardware performance parameter values 704 may be obtained for a variety of hardware outputs, including, without limitation, volume, color saturation, color temperature, touch screen sensitivity, and frequency response.

The set of reference hardware performance parameter values 702 and the set of target hardware performance parameter values 704 may be obtained from manufacturer data or may be created by the hardware settings translation engine over time. In some implementations, the hardware settings translation engine may store the target hardware adjustment map 706 for future use, either on the target computing device itself or in a remote storage location. Storing the target hardware adjustment map 706 may allow for faster translation when a user moves between the same two devices in the future.

Figure 8:
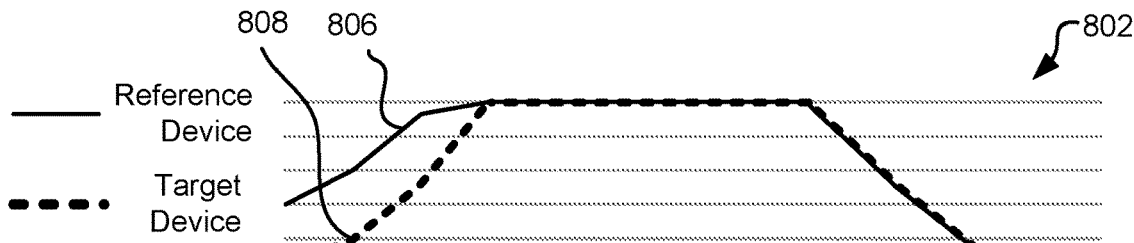
FIG. 8 illustrates example sets of hardware performance parameter values and an example target hardware adjustment map.
Figure 8:
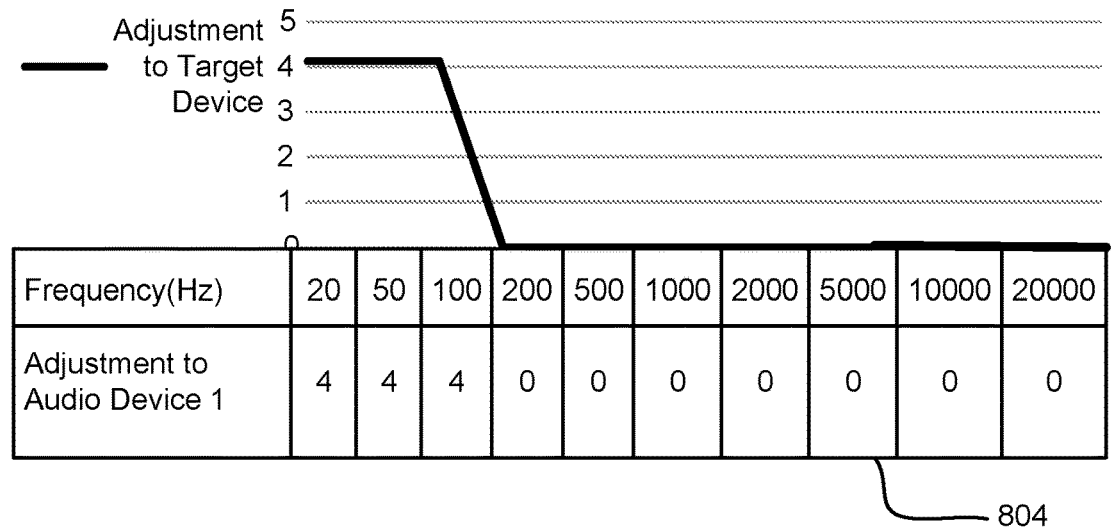
Figure 8:
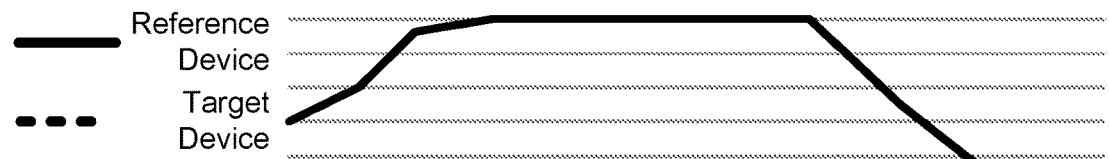

FIG. 8 illustrates example sets of hardware performance parameter values 802 and an example target hardware adjustment map 804. In this implementation, the sets of hardware performance parameter values 802 are expressed as audio frequency response curves. Adjusting the frequency response of a target device allows the target computing device to have a sound quality similar to that of a reference computing device, even if the target computing device is a lower quality than the reference computing device. Further, different frequency response curves are often desirable depending on what a user is listening to. For example, a user listening to classical music may desire a relatively flat frequency response curve, while a user listening to hip-hop music may desire higher output at lower frequencies. In one implementation, the hardware settings translation engine may distinguish between different types of audio output and adjust a device's frequency response based on the type of audio output.

In the implementation illustrated in FIG. 8, the hardware settings translation engine may adjust the frequency response of a target computing device so that it matches the frequency response of a reference computing device. A set of reference hardware performance parameter values 806 shows the audio output in decibels for the reference computing device at a range of different frequency inputs. A set of target hardware performance parameter values 808 shows the same information for the target computing device. As shown in the sets of hardware performance parameter values 802, the reference computing device and the target computing device perform differently. To standardize settings across devices, it is helpful to know the adjustments that may be made to the target computing device so that the frequency response of the target computing device matches the frequency response of the reference computing device. The target hardware adjustment map 804 shows the adjustments that may be made to the target computing device so that its frequency response matches the frequency response of the reference computing device.

The target hardware adjustment map 804 is created using the difference between the set of reference hardware performance parameter values 806 and set of target hardware performance parameter values 808. In FIG. 8, the set of reference hardware performance parameter values 806 and the set of target hardware performance parameter values 808 show that the reference hardware device and the target hardware device behave differently at frequencies below 200 Hz. The target hardware adjustment map 804 shows the adjustments that may be made to the set of target hardware performance parameter values 808 so that the audio output of the target device matches the audio output of the reference computing device, as shown in a combined frequency response curve 810.

Figure 9:
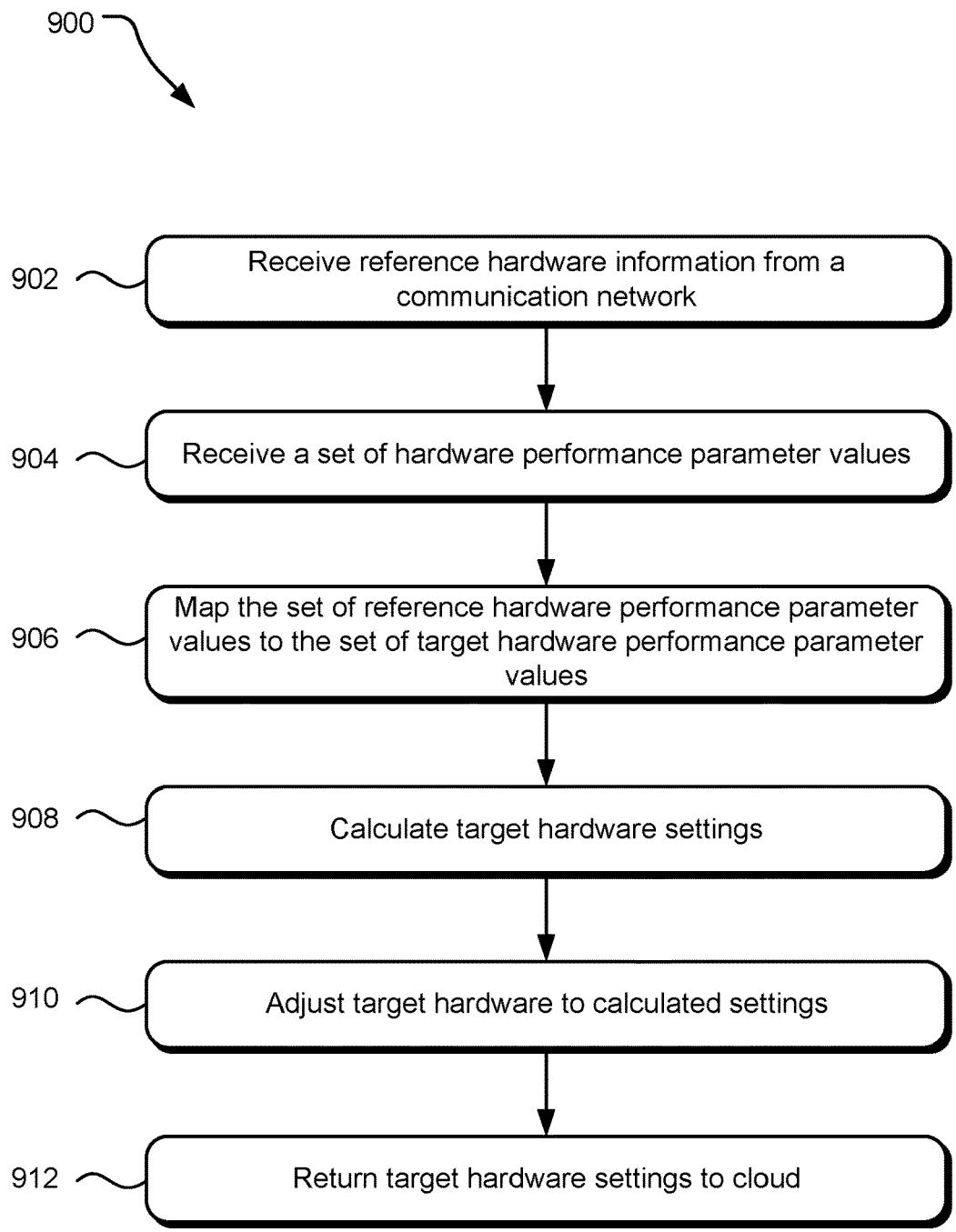
FIG. 9 illustrates example operations for adjusting hardware settings to match user preferences across devices.

FIG. 9 illustrates example operations 900 for adjusting hardware settings to match user preferences across devices. A receiving operation 902 receives reference hardware information from a communication network. The communication network may be, for example, the cloud, the internet, or any other communication network. The reference hardware information includes at least one or more hardware settings of a reference computing device and a reference hardware identifier. The reference hardware information may also include a set of reference hardware performance parameter values.

A second receiving operation 904 receives at least one set of hardware performance parameter values. The at least one set of hardware performance parameter values may be received from a communication network or may be stored on a device. During the second receiving operation 904, at least a set of target hardware performance parameter values are received. The set of target hardware performance parameter values may be received over a communication network, by sending a target hardware identifier and a query to the communication network and receiving the set of target hardware performance parameter values in return. In other implementations, the set of target hardware performance parameter values may be received from memory of the target device. In some implementations, when the set of reference hardware performance parameter values were not received as part of the reference hardware information in the receiving operation 902, the set of reference hardware performance parameter values are also received during the second receiving operation 904.

When either of the sets of hardware performance parameter values is received from a communication network, the second receiving operation 904 may include sending one or more hardware identifiers to the communication network as part of a request for a set of hardware performance parameter values.

A mapping operation 906 maps the set of reference hardware performance parameter values to the set of target hardware performance parameter values to create a target hardware adjustment map. The target hardware adjustment map allows for translation between the reference hardware settings and the target hardware settings. The target hardware adjustment map may be, for example, a graph or a table of hardware outputs for each possible hardware setting.

In one implementation, the sets of hardware performance parameter values are expressed as frequency response curves, plotting the hardware output response of the reference device and the target device over a range of frequencies. The mapping operation 906 creates a third curve, the reference hardware adjustment map, to find the adjustments that make the frequency response of the target device match the frequency response of the reference device at any given frequency.

A calculating operation 908 calculates target hardware settings. The target hardware settings are calculated based on the reference hardware adjustment map and the reference hardware settings. In some implementations, the calculation operation 908 also includes calculating the target hardware settings based on environmental inputs received from the reference hardware and the target hardware. For example, the reference hardware and the target hardware may both have ambient light sensors that collect data about the light around the reference hardware and the target hardware. The calculation operation 908 may take into account that, for example, the reference hardware is in a setting with a large amount of ambient light while the target device is in a dark room by lowering the screen brightness on the target hardware.

An adjusting operation 910 adjusts the target hardware to the calculated target hardware settings. During the adjusting operation 910, the hardware settings translation engine sends the target hardware setting to an interface in the target hardware that controls the hardware being set. For example, if the target hardware setting is screen brightness, the hardware settings translation engine sends the target hardware setting to a display interface in the target hardware. The display interface then adjusts the target hardware to the target hardware setting.

A returning operation 912 returns the calculated target hardware settings to the cloud. The returning operation 912 enables the target hardware adjustment map to be used again if the user switches between the same reference device and target device in the future. During the returning operation 912, any of the target hardware setting, the set of reference hardware performance parameter values, the set of target hardware performance parameter values, or the target hardware adjustment map may be returned to the cloud or any other communications network. In some implementations, the returning operation 912 may further include returning a user defined setting to the cloud or other communications network. For example, if the hardware settings translation engine calculates a target hardware setting and sets the target hardware setting, but the user then immediately changes the target hardware to another setting, that information would also be returned as part of the returning operation 912.

Figure 10:
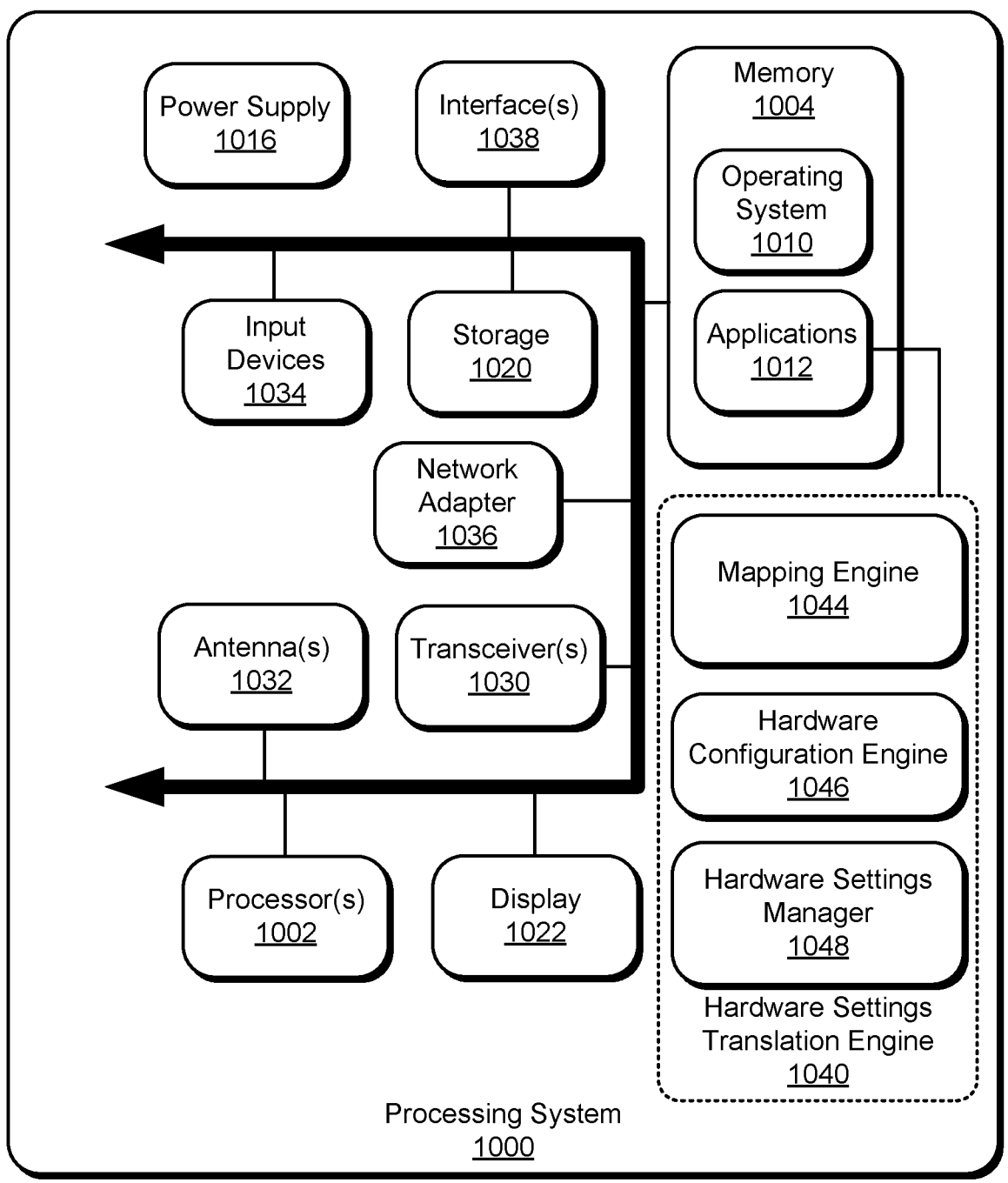
FIG. 10 illustrates an example system that may be useful in implementing the described technology.

FIG. 10 illustrates an example system (labeled as processing system 1000) that may be useful in implementing the described technology. The processing system 1000 may be a client device such as a laptop, mobile device, desktop, tablet, or a server/cloud device. The processing system 1000 includes one or more processor(s) 1002, and a memory 1004. The memory 1004 generally includes both volatile memory (e.g., RAM) and non-volatile memory (e.g., flash memory). An operating system 1010 resides in the memory 1004 and is executed by the processor(s) 1002.

One or more application programs 1012 modules or segments, such as a hardware settings translation engine 1040 are loaded into the memory 1004 and/or storage 1020 and executed by the processor(s) 1002. The application programs 1012 or modules may include the hardware settings translation engine 1040 implemented by a mapping engine 1044, hardware configuration engine 1046, hardware settings manager 1048, etc. which may be embodied in instructions stored in the memory 1004 and/or storage 1020 and executed by the processor(s) 1002. Data such as user preferences, hardware configurations, hardware responses, etc. may be stored in the memory 1004 or storage 1020 and may be retrievable by the processor(s) 1002 for use by the hardware settings translation engine 1040, the mapping engine 1044, the hardware configuration engine 1046, the hardware settings manager 1048, etc. The storage 1020 may be local to the processing system 1000 or may be remote and communicatively connected to the processing system 1000 and may include another server. The storage 1020 may store resources that are requestable by client devices (not shown).

The processing system 1000 includes a power supply 1016, which is powered by one or more batteries or other power sources and which provides power to other components of the processing system 1000. The power supply 1016 may also be connected to an external power source that overrides or recharges the built-in batteries or other power sources.

The processing system 1000 may include one or more communication transceivers 1030 which may be connected to one or more antenna(s) 1032 to provide network connectivity (e.g., mobile phone network, Wi-Fi®, Bluetooth®, etc.) to one or more other servers and/or client devices (e.g., mobile devices, desktop computers, or laptop computers). The processing system 1000 may further include a network adapter 1036, which is a type of communication device. The processing system 1000 may use the adapter and any other types of communication devices for establishing connections over a wide-area network (WAN) or local-area network (LAN). It should be appreciated that the network connections shown are exemplary and that other communications devices and means for establishing a communications link between the processing system 1000 and other devices may be used.

The processing system 1000 may include one or more input devices 1034 such that a user may enter commands and information (e.g., a keyboard or mouse). These and other input devices may be coupled to the server by one or more interfaces 1038 such as a serial port interface, parallel port, universal serial bus (USB), etc. The processing system 1000 may further include a display 1022 such as a touch screen display.

The processing system 1000 may include a variety of tangible processor-readable storage media and intangible processor-readable communication signals. Tangible processor-readable storage can be embodied by any available media that can be accessed by the processing system 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1000. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method of adjusting one or more target hardware settings of a target computing device relative to a reference computing device set to a reference hardware setting includes mapping a set of target hardware performance parameter values to a set of reference hardware performance parameter values to create a hardware adjustment map. The hardware adjustment map defines a relationship between a reference hardware performance parameter value corresponding to a hardware setting of the reference computing device and a target hardware performance parameter value corresponding to a hardware setting of the target computing device. The example method further includes determining the target hardware setting corresponding to the reference hardware setting based on mapped hardware performance parameter values of the hardware adjustment map. The example method further includes adjusting the target computing device in accordance with the determined hardware setting.

An example method of any preceding method includes receiving, through a communication network, reference hardware information including the reference hardware setting and a reference hardware identifier corresponding to the reference computing device.

An example method of any preceding method includes determining the set of reference hardware performance parameter values based on the received reference hardware identifier by receiving the set of reference hardware performance parameter values in response to a query sent over the communication network, the query sent over the communication network including the reference hardware identifier.

An example method of any preceding method includes determining a target hardware identifier corresponding to the target computing device, the target hardware identifier stored in memory of the target computing device.

An example method of any preceding method includes returning the hardware adjustment map to memory of the target computing device.

An example method of any preceding method is provided, wherein the set of reference hardware performance parameters includes a response definition of hardware of the reference computing device and the set of target hardware performance parameter values including a response definition of hardware of the target computing device.

An example method of any preceding method is provided, wherein the determined hardware setting is further based on a previous setting of the hardware of the target computing device.

An example method of any preceding method is provided, wherein the determined hardware setting is further based on a reference environmental input, the reference environmental input corresponding to a characteristic of the environment surrounding the reference computing device.

An example method of any preceding method is provided, wherein the determined target hardware setting is further based on a target environmental input, the target environmental input corresponding to a characteristic of the environment of the target computing device.

An example system for adjusting one or more target hardware settings of a target computing device relative to a reference computing device set to a reference hardware setting includes means for mapping a set of target hardware performance parameter values to a set of reference hardware performance parameter values to create a hardware adjustment map. The hardware adjustment map defines a relationship between a reference hardware performance parameter value corresponding to a hardware setting of the reference computing device and a target hardware performance parameter value corresponding to a hardware setting of the target computing device. The example system further includes means for determining the target hardware setting corresponding to the reference hardware setting based on mapped hardware performance parameter values of the hardware adjustment map and means for adjusting the target computing device in accordance with the determined hardware setting.

An example system of any preceding system includes means for receiving, through a communication network, reference hardware information including the reference hardware setting and a reference hardware identifier corresponding to the reference computing device.

An example system of any preceding system includes means for determining the set of reference hardware performance parameter values based on the received reference hardware identifier by receiving the set of reference hardware performance parameter values in response to a query sent over the communication network, the query sent over the communication network including the reference hardware identifier.

An example system of any preceding system includes means for determining a target hardware identifier corresponding to the target computing device, the target hardware identifier stored in memory of the target computing device.

An example system of any preceding system includes means for returning the hardware adjustment map to memory of the target computing device.

An example system of any preceding system is provided, wherein the set of reference hardware performance parameters includes a response definition of hardware of the reference computing device and the set of target hardware performance parameter values including a response definition of hardware of the target computing device.

An example system of any preceding system is provided, wherein the determined hardware setting is based on a previous setting of the hardware of the target computing device.

An example system of any preceding system is provided, wherein the determined hardware setting is based on a reference environmental input, the reference environmental input corresponding to a characteristic of the environment surrounding the reference computing device.

An example system of any preceding system is provided, wherein the determined target hardware setting is based on a target environmental input, the target environmental input corresponding to a characteristic of the environment of the target computing device.

An example hardware settings translation engine of a target computing device for adjusting a target hardware setting of the target computing device relative to a reference computing device set to a reference hardware setting includes a mapping engine configured to map a set of target hardware performance parameter values to a set of reference hardware performance parameter values to create a hardware adjustment map. The hardware adjustment map defines a relationship between a reference hardware performance parameter value corresponding to a hardware setting of the reference computing device and a target hardware performance parameter value corresponding to a hardware setting of the target computing device. The example hardware settings translation engine further includes a hardware configuration engine configured to determine the target hardware setting based on mapped hardware performance parameter values of the hardware adjustment map and a hardware settings manager configured to adjust the target computing device in accordance with the determined target hardware setting.

An example hardware settings translation engine of any previous hardware settings translation engine is provided, wherein the mapping engine receives, through a communication network, reference hardware information including the reference hardware setting and a reference hardware identifier corresponding to the reference computing device.

An example hardware settings translation engine of any previous hardware settings translation engine is provided, wherein the hardware configuration engine determines the set of reference hardware performance parameter values based on the received reference hardware identifier by receiving the set of reference hardware performance parameter values in response to a query sent over the communication network, the query sent over the communication network including the reference hardware identifier.

An example hardware settings translation engine of any previous hardware settings translation engine is provided, wherein the hardware configuration engine determines the target hardware setting based on an environmental input.

An example hardware settings translation engine of any previous hardware settings translation engine is provided, wherein the hardware configuration engine determines the target hardware setting based on a previous setting of the hardware of the target computing device.

Example one or more tangible processor-readable storage media are embodied with instructions for executing on one or more processors and circuits of a computing device a process for adjusting a target hardware setting of a target hardware computing device relative to a reference computing device set to a reference hardware setting includes mapping a set of target hardware performance parameter values to a set of reference hardware performance parameter values to create a hardware adjustment map. The hardware adjustment map defines a relationship between a reference hardware performance parameter value corresponding to a hardware setting of the reference computing device and a target hardware performance parameter value corresponding to a target hardware setting of the target computing device. The example one or more tangible processor-readable storage media are further embodied with instructions for executing on one or more processors and circuits of a device a process for determining the target hardware setting corresponding to the reference hardware setting based on mapped hardware performance parameter values of the hardware adjustment map and adjusting the target computing device in accordance with the determined target hardware setting.

Another example one or more tangible processor-readable storage media are embodied with instructions for executing on one or more processors and circuits of a device a process of any preceding process including receiving reference hardware information, the reference hardware information including a reference hardware identifier and the reference hardware setting.

Another example one or more tangible processor-readable storage media are embodied with instructions for executing on one or more processors and circuits of a device a process of any preceding process including returning the target hardware setting to a communication network.

Another example one or more tangible processor-readable storage media are embodied with instructions for executing on one or more processors and circuits of a device a process of any preceding process including determining the target hardware setting based on a reference environmental input, the reference environmental input corresponding to a characteristic of the environment surrounding the reference computing device.

Another example one or more tangible processor-readable storage media are embodied with instructions for executing on one or more processors and circuits of a device a process of any preceding process including determining the target hardware setting based on a previous hardware setting of the target computing device.

Another example one or more tangible processor-readable storage media are embodied with instructions for executing on one or more processors and circuits of a device a process of any preceding process including determining the target hardware setting based on a target environmental input, the target environmental input corresponding to a characteristic of the environment surrounding the target computing device.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for adjusting one or more target hardware settings of a target computing device relative to a reference computing device set to a reference hardware setting, the method comprising:
   receiving, at the target computing device, a plurality of reference hardware performance parameter values and a plurality of reference hardware settings from the reference computing device;
   generating, at the target device, a hardware adjustment map defining relationships between the plurality of reference hardware performance parameter values corresponding to the plurality of hardware settings of the reference computing device and a plurality of target hardware performance parameter values corresponding to a plurality of hardware settings of the target computing device;
   receiving, at the target computing device, a selected reference hardware setting from the reference computing device;
   determining a target hardware setting corresponding to the selected reference hardware setting based on the plurality of hardware performance parameter values of the hardware adjustment map; and
   adjusting the target computing device in accordance with the determined target hardware setting.

2. The method of claim 1, wherein the step of receiving, at the target computing device, a plurality of reference hardware performance parameter values and a plurality of reference hardware settings from the reference computing device comprises further comprises:
   receiving, through a communication network, reference hardware information including the plurality of reference hardware settings and a reference hardware identifier corresponding to the reference computing device.

3. The method of claim 2, further comprising:
   determining the plurality of reference hardware performance parameter values based on the received reference hardware identifier by receiving the plurality of reference hardware performance parameter values in response to a query sent over the communication network, the query sent over the communication network including the reference hardware identifier.

4. The method of claim 1, further comprising:
   determining a target hardware identifier corresponding to the target computing device, the target hardware identifier stored in memory of the target computing device.

5. The method of claim 1, further comprising:
   saving the hardware adjustment map to memory of the target computing device.

6. The method of claim 1, wherein the plurality of reference hardware performance parameter values includes a response definition of hardware of the reference computing device and the plurality of target hardware performance parameter values includes a response definition of hardware of the target computing device.

7. The method of claim 1, wherein the determined target hardware setting is further based on a previous setting of the hardware of the target computing device.

8. The method of claim 1, wherein the determined target hardware setting is further based on a reference environmental input, the reference environmental input corresponding to a characteristic of the environment surrounding the reference computing device.

9. The method of claim 1, wherein the determined target hardware setting is further based on a target environmental input, the target environmental input corresponding to a characteristic of the environment of the target computing device.

10. A hardware settings translation engine of a target computing device for adjusting a target hardware setting of the target computing device relative to a reference computing device set to a reference hardware setting, the hardware settings translation engine comprising:
    a mapping engine configured to receive a plurality of reference hardware performance parameter values and a plurality of reference hardware settings from the reference computing device, and generate a hardware adjustment map defining relationships between the plurality of reference hardware performance parameter values corresponding to the plurality of hardware settings of the reference computing device and a plurality of target hardware performance parameter values corresponding to a plurality of hardware settings of the target computing device;
    a hardware configuration engine configured to receive a selected hardware setting from the reference computing device and determine a target hardware setting based on the plurality of hardware performance parameter values of the hardware adjustment map; and
    a hardware settings manager configured to adjust the target computing device in accordance with the determined target hardware setting,
    each of the mapping engine, the hardware configuration engine and the hardware settings manager embodied in instructions stored in a memory of the target computing device and executed by a processor running on the target computing device.

11. The hardware settings translation engine of claim 10, wherein the mapping engine is further configured to receive, through a communication network, reference hardware information including the plurality of reference hardware settings and a reference hardware identifier corresponding to the reference computing device.

12. The hardware settings translation engine of claim 11, wherein the hardware configuration engine is further configured to determine the plurality of reference hardware performance parameter values based on the received reference hardware identifier by receiving the plurality of reference hardware performance parameter values in response to a query sent over the communication network, the query sent over the communication network including the reference hardware identifier.

13. The hardware settings translation engine of claim 10, wherein the hardware configuration engine is further configured to determine the target hardware setting based on an environmental input.

14. The hardware settings translation engine of claim 10, wherein the hardware configuration engine is further configured to determine the target hardware setting based on a previous setting of the hardware of the target computing device.

15. One or more tangible processor-readable storage media embodied with instructions for executing on one or more processors and circuits of a target computing device a process for adjusting a target hardware setting of the target computing device relative to a reference computing device set to a reference hardware setting, the process comprising:
   receiving, at the target computing device, a plurality of reference hardware performance parameter values and a plurality of reference hardware settings from the reference computing device;
   generating, at the target computing device, a hardware adjustment map defining relationships between a plurality of reference hardware performance parameter values corresponding to a plurality of hardware settings of the reference computing device and a plurality of target hardware performance parameter values corresponding to a plurality of hardware settings of the target computing device;
   receiving, at the target computing device, a selected reference hardware setting from the reference computing device;
   determining a target hardware setting corresponding to the selected reference hardware setting based on the plurality of hardware performance parameter values of the hardware adjustment map; and
   adjusting the target computing device in accordance with the determined target hardware setting.

16. The one or more tangible processor-readable storage media of claim 15, wherein the process further comprises:
   receiving reference hardware information, the reference hardware information including a reference hardware identifier and the plurality of reference hardware settings.

17. The one or more tangible processor-readable storage media of claim 15, wherein the process further comprises:
   returning the target hardware setting to a communication network.

18. The one or more tangible processor-readable storage media of claim 15, wherein the determined target hardware setting is further based on a reference environmental input, the reference environmental input corresponding to a characteristic of the environment surrounding the reference computing device.

19. The one or more tangible processor-readable storage media of claim 15, wherein the determined target hardware setting is further based on a previous hardware setting of the target computing device.

20. The one or more tangible processor-readable storage media of claim 15, wherein the determined target hardware setting is further based on a target environmental input, the target environmental input corresponding to a characteristic of the environment surrounding the target computing device.

* * * * *